Figure 1:
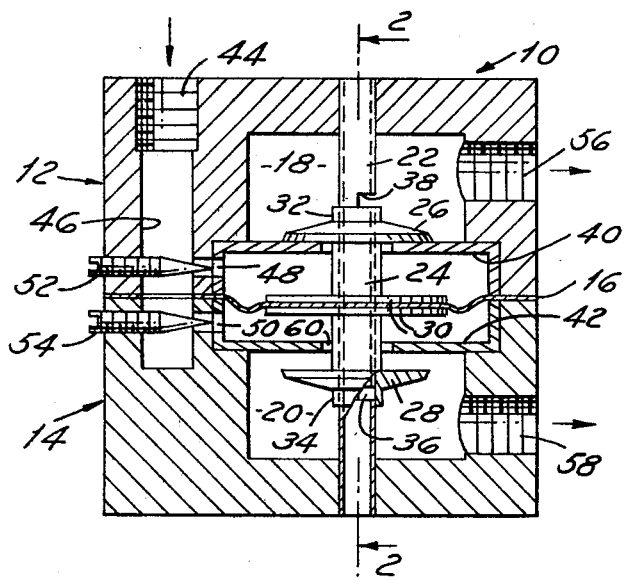

United States Patent [19]
Epple

[11] 3,722,525
[45] Mar. 27, 1973

[54] FLUID SWITCHING VALVE
[76] Inventor: Peter C. Epple, 20490 Balfour, Harper Woods, Mich. 48225
[22] Filed: Apr. 14, 1971
[21] Appl. No.: 133,845

[52] U.S. Cl. .............137/106, 137/119, 137/625.43
[51] Int. Cl................................................F16k 11/02
[58] Field of Search.137/106, 102, 112, 118, 625.43, 137/99, 99.5, 100, 101, 119, 103, 119, 624.14, 625.27; 235/201 ME; 91/318

[56] References Cited

UNITED STATES PATENTS

| | | | |
|---|---|---|---|
| 3,592,215 | 7/1971 | Davis | 137/112 |
| 2,598,180 | 5/1952 | Kenyon | 137/106 |
| 2,956,577 | 10/1960 | Kirkham | 137/118 |
| 3,042,062 | 7/1962 | Holloway | 137/112 |
| 2,441,201 | 5/1948 | Ludwig | 137/106 |

Primary Examiner—Martin P. Schwadron
Attorney—Barnes, Kisselle, Raisch & Choate

[57] ABSTRACT

A flip-flop valve which automatically reverses in response to flow conditions or pressure supply to assure distribution selectively of pressure to selected outputs. A central control element subject to pressure in the system is supplemented by side elements which provide pressure area imbalance at selected times in the operation in response to dynamic flow conditions in the valve to cause reversal of direction to output ports.

6 Claims, 8 Drawing Figures

PATENTED MAR 27 1973

3,722,525

SHEET 1 OF 3

INVENTOR
*PETER C. EPPLE*

BY
*Barnes, Kisselle, Raisch & Choate*

ATTORNEYS

FLUID SWITCHING VALVE

This invention relates to a Fluid Switching Valve and more particularly to a valve which will control pressure in two different directions from a single source.

It is an object of the invention to provide a switching valve which is bi-stable with an over-center snap action and which is dynamically sensitive in the sense that it is responsive to flow rather than static conditions.

It is a valve whose pressure output can be controlled with respect to amplitude as well as frequency over a wide range. It may also be made responsive to pressure supply to react in a predictable manner if supply pressure is cut off.

The valve may be used in open circuits to convert a steady flow into two pulsating outputs or to sense loads represented by a reduction of flow. In closed circuits it can provide oscillating action without the need of electrical or mechanical assistance.

Basic to the idea is the design consideration of creating a pressure differential across the center of the valve with the higher pressure acting on a smaller effective area than the lower pressure and to make this pressure differential vary with the flow through the valve. The pressure differential is simply the result of channeling the flow through an adjustable restriction and the area differential is obtained by subjecting the valve side members at the flow side to pressure on both faces while venting one face of the opposite member. One special version which incorporates balanced pressure areas responds to reversed flow after the supply pressure is removed.

Other objects and features of the invention relating to the details of construction and operation will be apparent in the following description and claims wherein the principle of operation and the utility of the device is set forth together with the best mode presently contemplated for practice of the invention.

Figure 2:
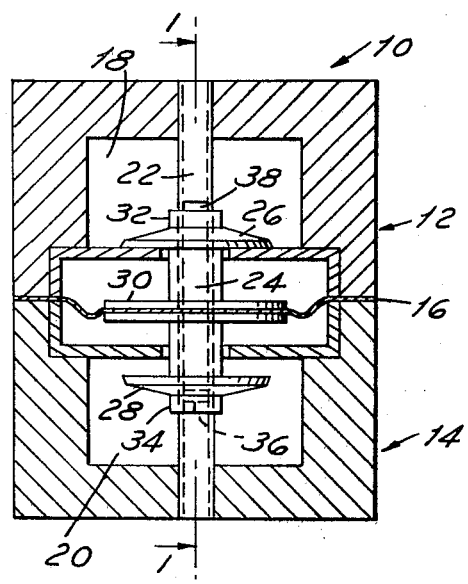

Drawings accompany the disclosure and the various views thereof may be briefly described as:

FIG. 1, a sectional view of the valve taken on line 1—1 of FIG. 2.

FIG. 2, a sectional view of the valve taken on line 2—2 of FIG. 1.

Figure 3:
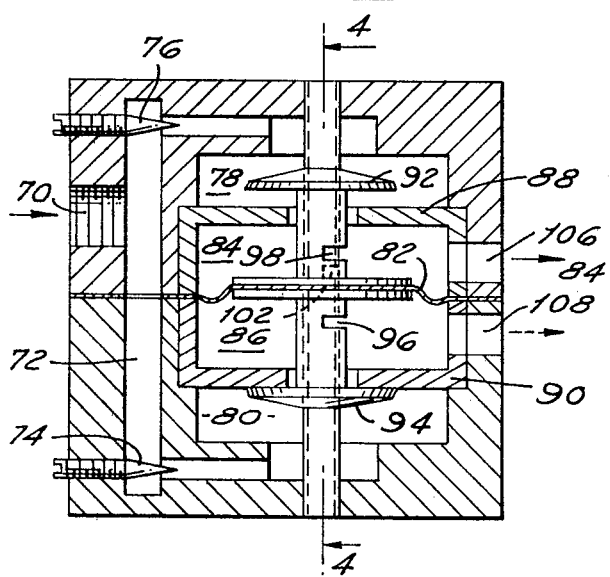
Figure 4:
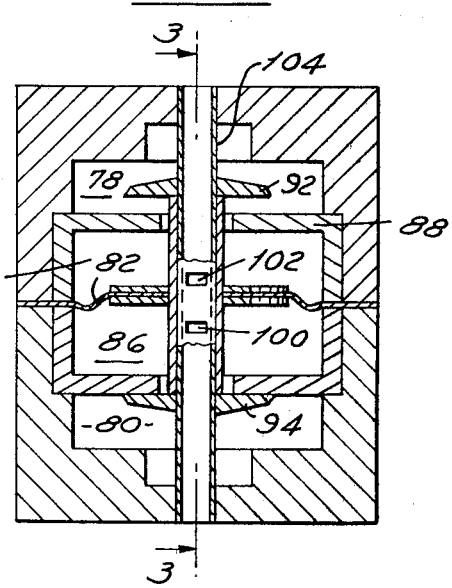

FIG. 3, a view of a modified valve with the valve in another position, actually a sectional view on line 3—3 of FIG. 4.

FIG. 4, a sectional view on line 4—4 of FIG. 3.

Figure 5:
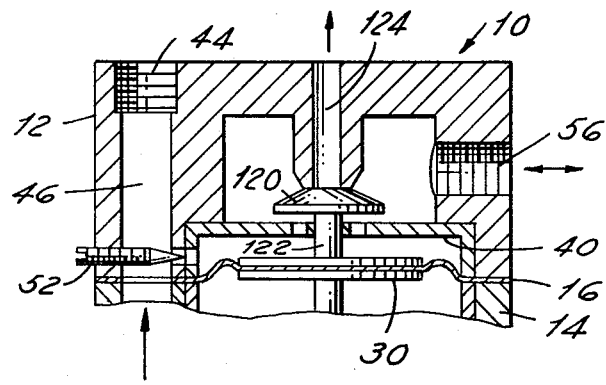

FIG. 5, a view of a modification of the valve shown in FIG. 1 to create a directional bias.

Figure 6:
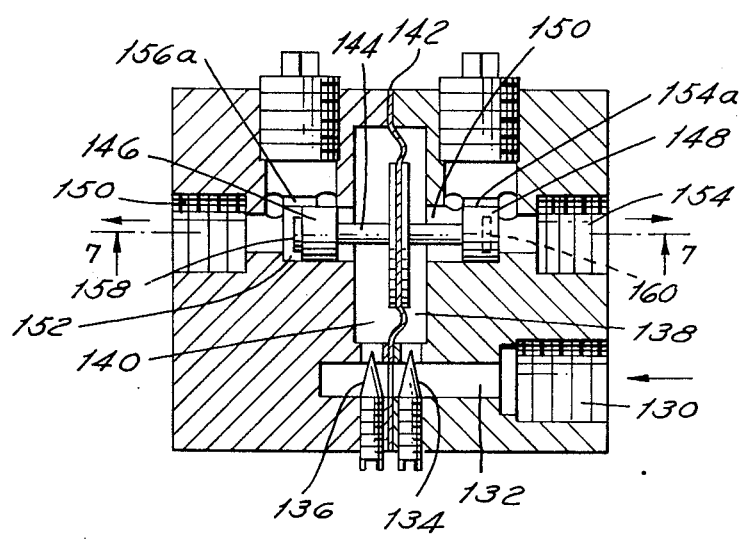

FIG. 6, a sectional view of yet another modification of the valve.

Figure 7:
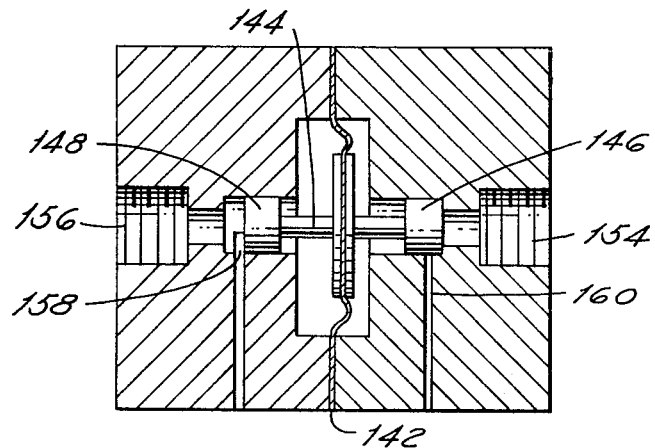

FIG. 7, a sectional view on line 7—7 of FIG. 6.

Figure 8:
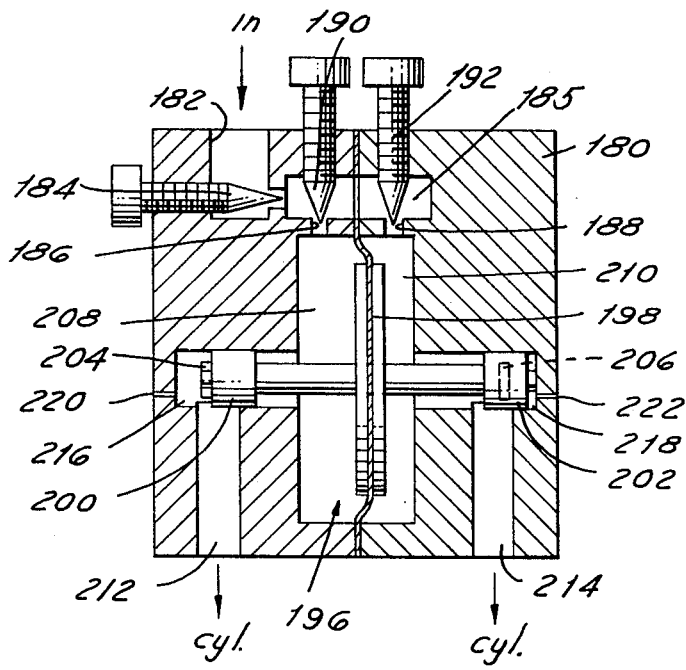

FIG. 8, a modified construction responsive to interruption of supply pressure.

The valves to be described, and as shown in the drawings, are various versions of valves which would be incorporated in fluid circuits containing a reversible motor at the downstream legs which is reciprocated by the output of the valve.

Referring to FIG. 1, a valve housing 10 is composed of two sections 12 and 14 which are suitably bolted together. Between these sections is a diaphragm sheet 16. Each of the sections 12 and 14 has respective chambers 18 and 20 through which passes a tube 22 which serves as a support and guide for a central reciprocating tube 24 carrying valve discs 26 and 28. The tube 24 passes through the diaphragm 16 which is supported centrally by discs 30.

It will be noted that each valve disc 26 and 28 has a collar 32 and 34 respectively which cooperate with wall openings 36 and 38 in the tube 22. At the inside end of each chamber 18 and 20 is a box valve chamber 40 and 42, respectively, each of which is apertured to permit the passage of, as well as to provide clearance around, the tubes 22 and 24, each chamber having a wall which serves as a seat in cooperation with the valve discs 26 and 28. The peripheral edges of these box chambers 40 and 42 are also sealed around the diaphragm 16. A pressure entrance port 44 leads to a passage 46 in the assembly which terminates at control ports 48 and 50 and leading to the interior of the respective box valve chambers 40, 42, each port controlled by needle valves 52 and 54 respectively accessible through one end wall of the assembly. Outlet ports 56 and 58 are provided respectively from chambers 18 and 20. It will be noted that the tube 22 is opened at its ends to serve as an exhaust outlet for ports 36 and 38.

In the operation of the embodiment shown in FIGS. 1 and 2 with a pressure supply entering at 44, there will be pressure at the restricted ports 48 and 50. With the valve in the position shown in FIG. 1, the pressure will be flowing through an opening 60 around the tube 24 to the chamber 20 and out the passage 58. At this time, it will be seen that the port 36 is closed and the port 38 is opened, exhausting the chamber 18.

It is assumed that the valve is used in a system where back pressure will develop in the outlet reflecting back to the chamber 20 ultimately and, by reason of the fact that the valve disc 26 is closed and there is a pressure drop across the restricted port 50, pressure will build up in the valve chamber 40 and due to the pressure area imbalance, the diaphragm 30 will shift upwardly opening the valve 26 which closes exhaust port 38 and opens exhaust port 36. Thus, flow will then be directed to the outlet 56 and continue in this direction until a back pressure develops at which time the valve will reverse again to the first position.

Referring to the embodiment in FIGS. 3 and 4, the operation is very much the same except that the flow direction through the valve is reversed. An inlet 70 feeds fluid to passage 72 and the respective restriction valve 74 and 76 leading to chambers 78 and 80. Again, a diaphragm 82 separates chambers 84 and 86 formed by the valves boxes 88 and 90.

A tube between disc valves 92 and 94 has wall openings 96 and 98 which cooperate with openings 100 and 102 in the cross tube 104 which has exhaust openings at each end. A first outlet 106 leads from chamber 84 and a second outlet 108 leads from a chamber 86. In the operation of this system, pressure entering port 70 reaches the two restricted valves 74 and 76 but with the valve in the position shown in FIG. 3, flow is passing through chambers 78 and 84 to the outlet 106 while the chamber 86 is exhausted through ports 96 and 100. When the back flow resistance builds up in chambers 84 and 78, the pressure area in the chambers 78–84 will shift the valve to open the disc 94, thus closing port 100 and opening port 102 causing flow to pass through the chambers 80 and 86 to the outlet 108. The valves shown in FIGS. 1 to 4 can be characterized as servo valves which are designed for "dead head" applications.

During the switching process in each case, an exhaust port is opened at the previous active side through which the accumulated charge is dumped. If, for example, both downstream legs are connected to a cylinder incorporating a piston, the pressure needed for switching would create alternating bi-directional forces on the piston, that is, the latter will be moved back and forth between the two opposing forces. The pressure point and the frequency of the switching process are a function of the valve dimensions, the fluid capacity of the downstream circuit, the position of the metering screws, and the flow into the valve.

With the first two parameters fixed by design and circuit requirements, flow control into the valve will determine the pressure at which switching occurs and these pressures may be further lowered or raised by adjustments of the metering screws for one or the other side of the valve, that is, it is possible to switch one side at a considerably lower pressure than the other side.

It is desirable to have the valve as close as possible to the actuator at the downstream side. If the fluid being used is a gas, rigid tubing can be used in the associated circuit; but if an incompressible liquid is to be used, it is preferable to use some buffering in the form of flexible, resilient tubing, or the incorporation of accumulators in the downstream legs preferably placed close to the valve. In this case, the diaphragm may be replaced by a large piston.

It may be desirable to bias the valves to one side in order to produce a particular starting mode or to prevent the possible charging up of both sides concurrently.

In FIG. 5, a modified valve construction is shown very similar to the construction shown in FIG. 1 wherein similar reference characters have been used but the valve disc 120 on a shaft 122 serves at the upper end of its stroke to close an exhaust passage 124 leading to the outside of the casing 12.

In FIGS. 6 and 7, a third embodiment of a servo valve is illustrated having an inlet 130 leading to a passage 132 opening to adjustment valves and corresponding restrictive ports 134 and 136 which, in turn, open, respectively, to chambers 138 and 140 on either side of a diaphragm 142. The diaphragm is connected to a cross rod 144 with a piston 146 at one end of the rod and a piston 148 at the other end each operating in chambers 150 and 152 leading respectively to outlets 154 and 156 through ports 154a and 156a.

In chambers 150 and 152 are exhaust ports 158 and 160 which are opened and closed by the pistons 146 and 148. The operation of this system is essentially the same as that described in connection with FIGS. 1 to 4 with the exception of the different valve arrangement.

A simplified version of these valves with the exhaust ports omitted would find usage in open circuits where resistances such as nozzles or orifices in the downstream legs serve to create the back pressure necessary for switching.

It might be said that the valves described in their servo action are not static valves but rather dynamic valves that need to have flow in order to operate. Two factors keep the valve stable in one or the other position. One is the pressure drop created at the active flow side by the needle valve. This places a higher pressure at the passive no-flow side as compared to the active side where some of the pressure head is converted to velocity head. The second is the pressure head prevailing in the passive downstream leg for some time after switching has occurred. The total force differential, that is, pressure multiplied by the effective area, immediately after switching is considerable. However, it will decrease in time as the pressure head at the active side increases due to a lesser flow and at a higher rate than at the passive side while the charge at the previously active downstream leg diminishes. Eventually an equilibrium between the total forces will be reached and due to the differential in effective area exceeded. This reversal starts the switching process which will be accelerated by some additional force differential created by the cessation of flow at the previously active side and initially high flow at the previously passive side. This causes switching to take place very rapidly.

A shut-off can be accomplished if in the valve design shown in FIGS. 6 and 7 a piston is guided in a sleeve which lacks all porting. Such a valve incorporated in an open or closed circuit would still be pressure (flow) sensitive and after switching permit the accumulated charge to be exhausted. Pilot pressure applied to the blind piston or manual action would again start flow and stability.

In FIG. 8, a slightly modified construction is shown. This construction for usage in closed circuits only is essentially the same as the valve shown in FIGS. 6 and 7 with a housing 180 having an entry pressure supply port 182 leading through a needle valve 184 to a common supply chamber 185 having two outlet ports 186 and 188 controlled by needle valves 190 and 192. Ports 186 and 188 lead to opposite sides of a diaphragm 194 in central chamber 196, the diaphragm controlling a rod 198 having port control pistons 200 and 202 at respective ends. These pistons open and close respective exhaust ports 204 and 206 and also control flow from chambers 208 and 210, on opposite sides of diaphragm 194, to respective cylinder ports 212 and 214. At each end of the piston cavities 216 and 218 are small bleed holes 220 and 222 to expose the pistons to atmospheric pressure. Thus, the outer face of the piston at the active (flow) side is not subjected to the back pressure while in the extreme position.

This results in a balanced condition as the pressure differential across the diaphragm approaches zero and no piston movement will take place as flow ceases. Dropping the supply pressure at 182 down to zero will cause a momentary reversal in flow at the open side of the valve and the creation of a reversed pressure differential across the diaphragm. The resulting net force will pull the piston just past center to a point where further flow is blocked. If in this position the outer piston face is now subjected to the back pressure above a predetermined amount, then complete switching will take place and the previous charge will be dumped to the atmosphere. A renewed supply pressure will find the valve open in the opposite direction and the process will be repeated.

If, however, the relationship between piston metering lands and port opening is such that the piston end remains at atmospheric pressure after the initial piston movement has taken place, then no further action occurs until the supply is reactivated. Since the device has a semieopen center a small opening at the previously passive side permits renewed flow and the associated pressure differential will now complete the switching and in the process open the retained charge to atmosphere.

From the above, it is evident that the switching characteristic is strictly a function of piston metering land and port size. An underlapped condition results in complete switching and loss of charge upon supply pressure removal while an overlapped condition will hold the charge until supply pressure is restored.

This valve will also respond to pilot pressure applied selectively through the bleed holes 220, 222 in the piston cavity. It is now a pilot operated direction control valve featuring overcenter snap action. Only very low pilot pressure is required for initiation of switching action.

The valve is so designed that the smaller the differential area between the two sides with respect to the overall area subjected to pressure, the greater is the pressure recovery in the non-operating side before switching takes place. In some installations, this may have distinct advantages and the control can be obtained by advance calibration for the particular need.

What is claimed as new is as follows:

1. A fluid switching valve comprising a housing forming a pair of control chambers open to a fluid pressure inlet, and a flow chamber connected respectively to each control chamber, each flow chamber having a work port outlet, a piston element between the control chambers movable selectively toward each, a secondary two-sided piston-valve element in each flow chamber connected to move with said piston element having one side exposed to a control chamber and one side exposed to a flow chamber, valve means responsive to movement of said piston-valve elements to control flow from each said control chamber to a respective flow chamber and to direct fluid from said flow chambers respectively to a work port outlet and an exhaust port whereby the combined effective area of a piston-valve element and said piston element on the side of a particular control chamber is increased in the direction of the other control chamber when a particular control chamber is open to its respective flow chamber.

2. A fluid switching valve as defined in claim 1 in which the piston element and the piston-valve elements are connected to move simultaneously from a position closing one control chamber from its respective flow chamber and opening the other control chamber to its respective flow chamber.

3. An automatic switching valve for controlling fluid from a pressure source to selective work ports which comprises:
   a. a housing having a pressure source opening and an operating chamber,
   b. a pressure responsive member movable in said operating chamber and dividing said chamber into flow chambers, each connected to an inlet from a pressure source,
   c. means forming outlet chambers connected respectively to said flow chambers,
   d. valve means between said flow chambers and said outlet chambers movable to position selectively to permit flow and to block flow between said respective flow and outlet chambers, said valve members having areas exposed to flow in each said respective chambers in the direction of movement of said valves, and
   e. means connecting said pressure responsive means and said valve means for simultaneous movement wherein movement of said pressure responsive member in one direction will shift one of said valve members to a closed position and the other to an open position and vice versa, wherein flow through one pair of flow and outlet chambers will produce reduced pressure therein and reduction of said flow will increase said pressure to allow the combined pressure areas of said pressure responsive member and a valve means to shift the member to another position.

4. A valve as defined in claim 3 in which a flow restriction is located between said pressure source opening and each said flow chamber.

5. A valve as defined in claim 3 in which the combined effective pressure area, in the direction of motion, of said pressure responsive member and a respective valve means is greater in the flow position of the valve member than in the non-flow position.

6. A fluid switching valve comprising a housing forming a pair of control chambers open to a fluid pressure inlet, and a flow chamber connected respectively to each control chamber, a piston element between the control chambers movable selectively toward each, a secondary two-sided piston-valve element in each flow chamber connected to move with said piston element having one side exposed to a control chamber and one side exposed to a flow chamber, valve means responsive to movement of said piston-valve elements to control flow from each said control chamber to a respective flow chamber and to direct fluid from said flow chambers respectively to a work port and an exhaust port whereby the combined effective area of a piston-valve element and said piston element on the side of a particular control chamber is increased in the direction of the other control chamber when a particular control chamber is open to its respective flow chamber, a hollow tube disposed in said housing extending through each said chambers, and port means formed in the wall of said tube positioned at said respective flow chambers to be opened and closed by said respective piston-valve elements selectively to exhaust said flow chambers.

* * * * *